United States Patent
Johnson

(10) Patent No.: US 10,183,601 B2
(45) Date of Patent: Jan. 22, 2019

(54) VEHICULAR COLLECTION AND DISPOSAL KITS AND METHODS

(71) Applicant: Jeffrey Johnson, Flowood, MS (US)

(72) Inventor: Jeffrey Johnson, Flowood, MS (US)

( * ) Notice: Subject to any disclaimer, the term of this patent is extended or adjusted under 35 U.S.C. 154(b) by 0 days.

(21) Appl. No.: 15/496,053

(22) Filed: Apr. 25, 2017

(65) Prior Publication Data

US 2018/0304793 A1    Oct. 25, 2018

(51) Int. Cl.
*B60N 3/04*     (2006.01)
*B60N 3/08*     (2006.01)

(52) U.S. Cl.
CPC ............ *B60N 3/08* (2013.01); *B60N 3/046* (2013.01)

(58) Field of Classification Search
CPC ...... B60N 2/305; B60N 2/206; B60N 2/3013; B60N 2/879; B60N 2/64; B60N 5/757; B60N 2/79; B60N 3/102
USPC ... 296/37.15, 37.14, 37.16, 29, 25, 53, 68.1, 296/1.08, 70, 66; 297/188.1, 188.08, 297/188.04, 440.15, 452.18, 481; 224/275, 413, 542, 562, 585, 902
See application file for complete search history.

(56) References Cited

U.S. PATENT DOCUMENTS

| | | | | |
|---|---|---|---|---|
| 3,193,326 | A * | 7/1965 | Smith | B60N 2/2821 174/153 G |
| 5,397,160 | A * | 3/1995 | Landry | B60R 7/04 224/539 |
| 6,860,415 | B1 * | 3/2005 | White | B60R 11/0229 224/275 |
| 7,448,345 | B1 * | 11/2008 | O'Donnell | A01K 1/0272 119/28.5 |
| 8,366,191 | B2 * | 2/2013 | Parker | B60N 2/2809 296/37.8 |
| 2012/0125966 | A1 * | 5/2012 | Greenspon | A45C 3/001 224/572 |

OTHER PUBLICATIONS

"Auto Car Vehicle Garbage Can Trash Bin Waste Container Quality Plastic Extra Large, 1 Gallon, 4 Liter,: Automotive." Amazon.com: Auto Car Vehicle Garbage Can Trash Bin Waste Container Quality Plastic Extra Large 1 Gallon, 4 Liter,: Automotive, www.amazon.com/Vehicle-Garbage-Container-Quality-Plastic/dp/B071ZYPFMH. Coli Alma, Apr. 3, 2018.
"Drive™ | The Drive Bin™ XL." Drive™ Auto Products, driveautoproducts.com/products/the-drive-bin-xl. Apr. 3, 2018.

* cited by examiner

*Primary Examiner* — D Glenn Dayoan
*Assistant Examiner* — Sunsurraye Westbrook
(74) *Attorney, Agent, or Firm* — Tarolli, Sundheim, Covell & Tummino LLP

(57) ABSTRACT

Kit and methods for collecting material in a vehicle are provided. A kit includes a collapsible receptacle fabricated from a hard material, a driver side fastener sized and configured to attach to the back of a driver side car seat, a front passenger side fastener sized and configured to attach to the back of a front passenger side car seat, an adjustable strap, and a floor mat. In use, the collapsible receptacle is releasably coupled to the floor mat and the strap is connected to the driver side fastener and the front passenger side fastener and secures the collapsible receptacle in place. After use, the collapsible receptacle can be detached from the floor mat and the material from the receptacle can be removed. When not in use, the receptacle can be collapsed to assume a stowed position.

14 Claims, 5 Drawing Sheets

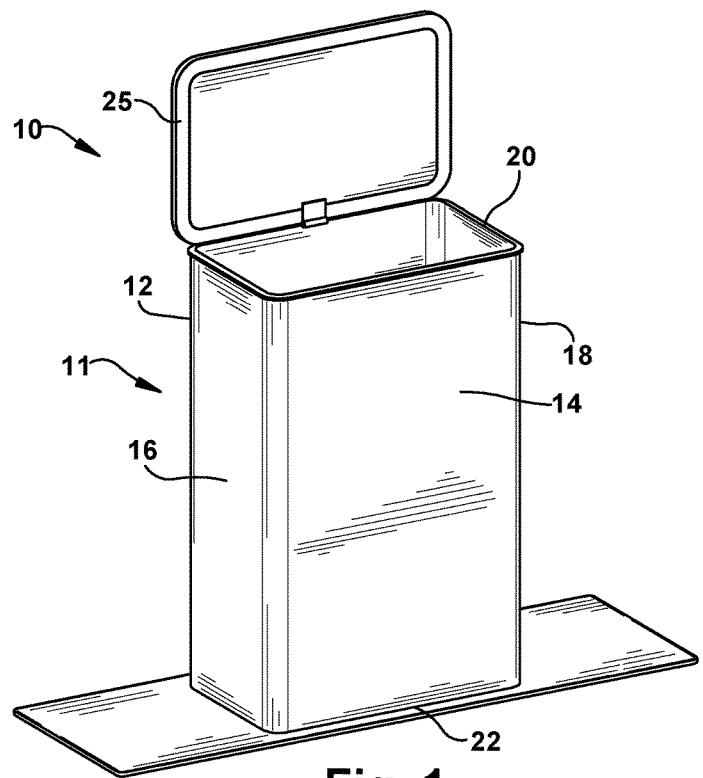
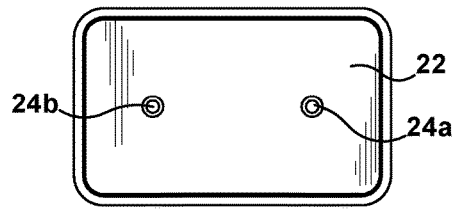
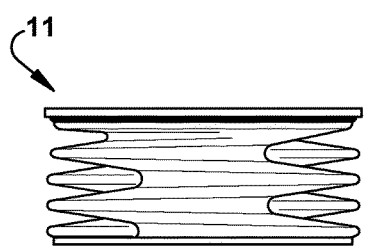
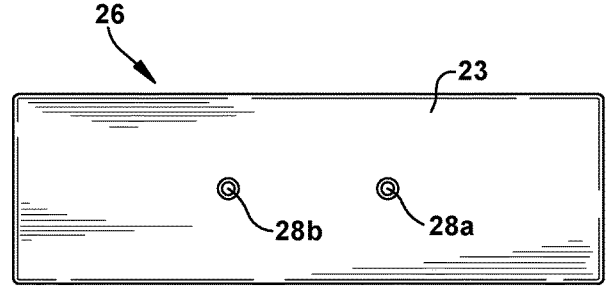
Fig. 1
Fig. 2
Fig. 3
Fig. 4

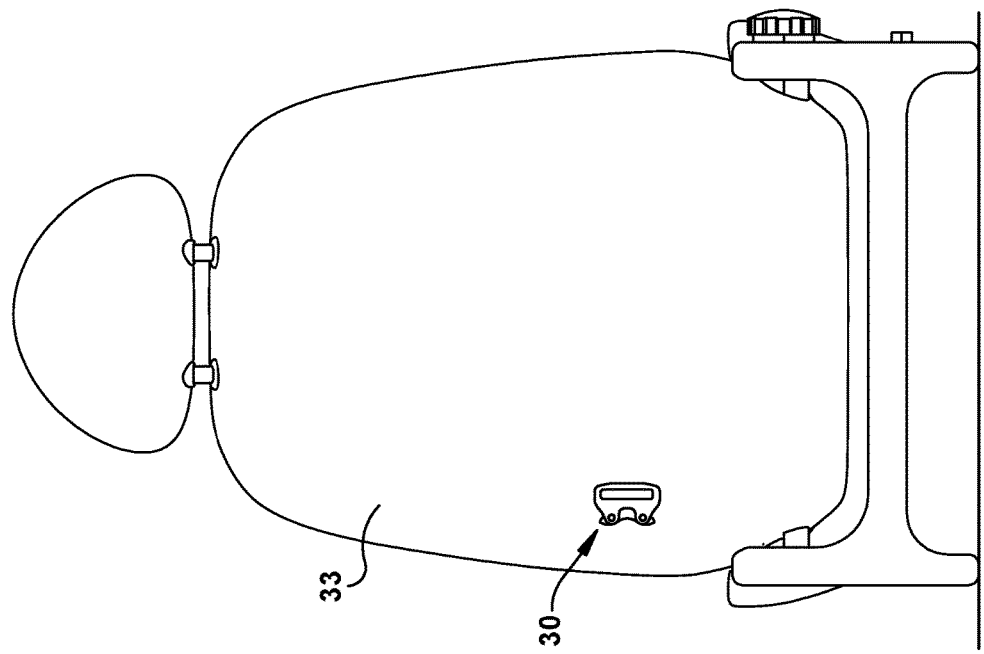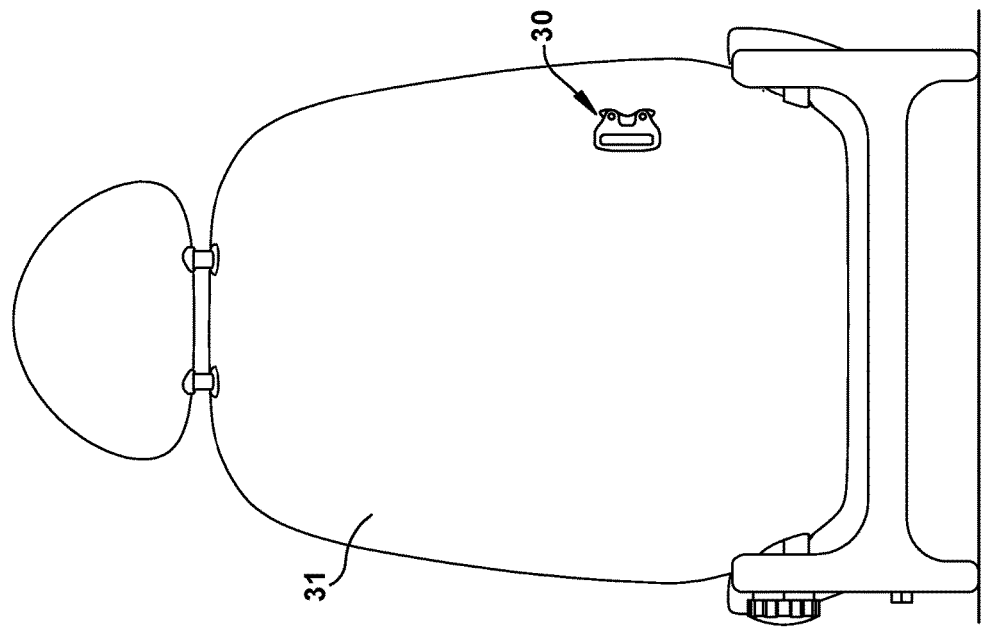

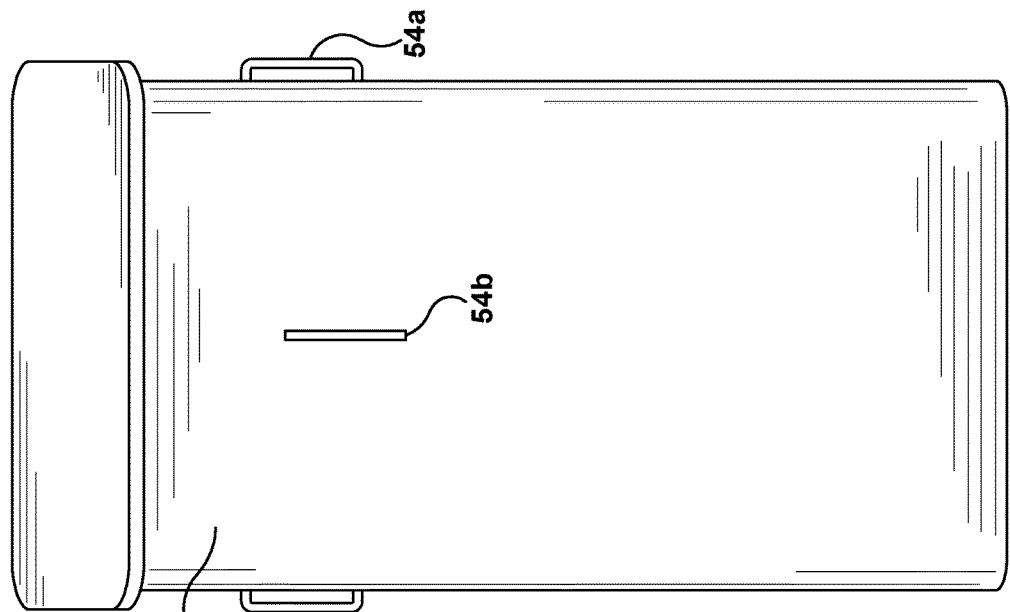
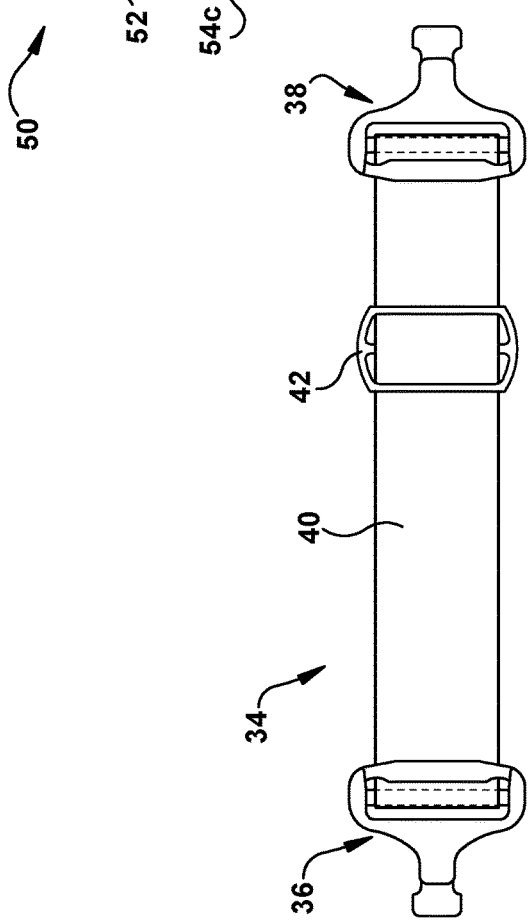
Fig. 7
Fig. 8

VEHICULAR COLLECTION AND DISPOSAL KITS AND METHODS

TECHNICAL FIELD

The present disclosure relates to kits and methods for collecting and disposing of material from a vehicle.

BACKGROUND

Trash bags and soft plastic or nylon containers are often used in cars to collect discarded material or to store items. Because such devices are fabricated from soft materials, they do not always adequately retain the contents placed therein. Trash cans have also been used in cars, but such cans tend to be top-heavy and tip over during operation of the car. As such, a need exists for a sturdy and efficient device that can be used to collect or store items in a car and that maintains it position during operation of the car.

BRIEF DESCRIPTION OF THE DRAWINGS

FIG. 1 is a perspective view of a collapsible receptacle attached to a floor mat in an upright, non-collapsed position according to an embodiment of a kit the present disclosure.

FIG. 2 is a plan view of the bottom side of a collapsible receptacle according to an embodiment of a kit of the present disclosure.

FIG. 3 is a perspective view of a collapsible receptacle in a collapsed position according to an embodiment of a kit of the present disclosure.

FIG. 4 is a plan view of the top side of a floor mat according to an embodiment of a kit of the present disclosure.

FIG. 5 is a plan view of a driver side fastener attached to the back of a driver side car seat according to an embodiment of a kit of the present disclosure.

FIG. 6 is a plan view of a front passenger side fastener attached to the back of a front passenger side car seat according to an embodiment of a kit of the present disclosure.

FIG. 7 is a plan view of an adjustable strap according to an embodiment of a kit of the present disclosure.

FIG. 8 is a perspective view of a collapsible receptacle according to an embodiment of a kit of the present disclosure.

DETAILED DESCRIPTION

Figure 9:
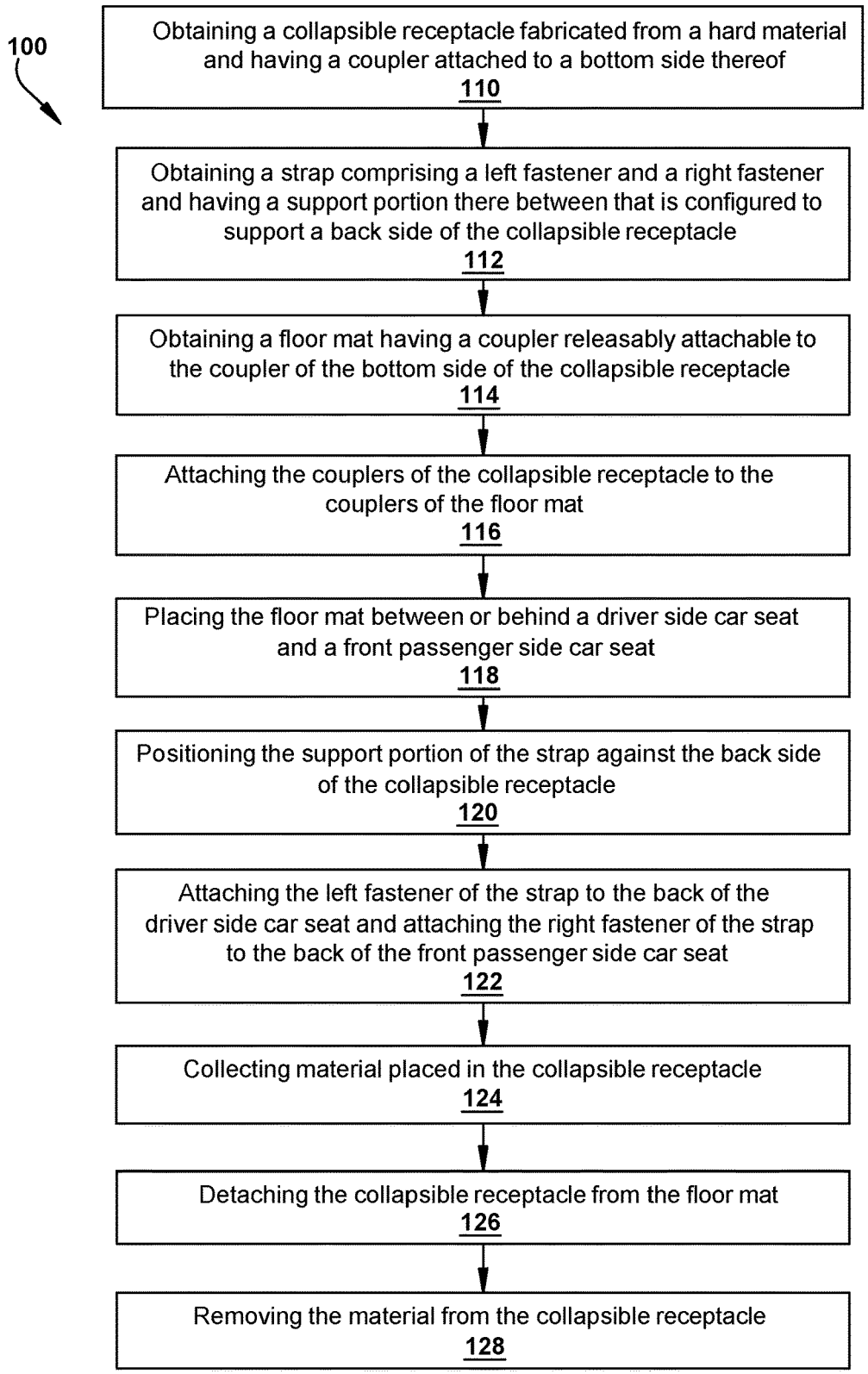
FIG. 9 is a flow chart depicting steps of a method of collecting and removing material from a vehicle according to an embodiment of the present disclosure.

The present disclosure refers to the term "substantially" with respect to certain shapes. By "substantially" is meant that the shape of the element need not have the mathematically exact described shape but can have a shape that is recognizable by one skilled in the art as generally or approximately having the described shape. By "integral" or "integrated" is meant that the described components are fabricated as one piece during manufacturing or the described components are otherwise not separable using a normal amount of force without damaging the integrity (i.e. tearing) of either component. A normal amount of force is the amount of force a user would use to remove a component meant to be separated from the other component without damaging either structure. The disclosure also refers to the terms "front," "back," "top," "bottom," "left" and "right," with certain components. These terms refer to configuration of the components as illustrated in the drawings and as indicated by the character references. Further, as used herein with respect to a described element, the terms "a," "an," and "the" include at least one or more of the described element unless otherwise indicated. Further, the term "or" refers to "and/or" unless otherwise indicated. In addition, it will be understood that when an element is referred to as being "over," "on," "attached" to, "connected" to, "coupled" to etc., another element, it can be directly over, on, attached to, connected to, coupled to, etc. the other element or intervening elements may also be present. In contrast, when an element is referred to as being, for example, "directly over," "directly on," "directly attached" to, "directly connected" to or "directly coupled" to another element, there are no intervening elements present.

The present disclosure generally relates to kits and methods that are used to collect disposable material or store material in a vehicle. Although the present disclosure is described with respect to kits and methods for collecting trash from a car, embodiments of the present disclosure can be used to collect or store other items in a vehicle.

Referring to FIGS. 1 and 2, in an embodiment, a kit 10 for collecting material in a vehicle comprises a collapsible receptacle 11 having a front side 12, a back side 14, left side 16, a right side 18, an open top side 20, and a bottom side 22 having a coupler 24 attached thereto. Although FIG. 2 illustrates two couplers, the receptacle can include any suitable number of couplers so long as the receptacle can be securely attached to a floor mat of the kit as described in more detail below. The receptacle is fabricated from a hard material such that the receptacle maintains its shape in an upright, non-collapsed position as shown in FIG. 1. For example, the receptacle can be fabricated from a hard plastic, metal, or metallic material as opposed to a nylon, mesh or fabric material. As depicted in FIG. 3, receptacle 11 is collapsible such that the receptacle can be collapsed when not in use. The kit can further include a lid 25 connected or connectable to the receptacle to cover the open top side of the collapsible receptacle as illustrated in FIG. 1.

The receptacle is sized and dimensioned to fit between or behind a driver side car seat and a front passenger side car seat of different types of vehicles. For example, the receptacle can have a height of between about 12 inches to about 28 inches, a width of between about 8 inches to about 18 inches, and a depth of between about 6 inches to about 14 inches. The kit can include a single receptacle or multiple receptacles of different sizes to accommodate different types of vehicles. Alternatively or in addition, the height, width and/or depth of the receptacle can be adjustable to fit the interior compartment of different types of vehicles. For example, the receptacle can include one or more ratchet mechanisms to adjust the height, width and/or depth of the receptacle. Exemplary types of vehicles in which the receptacle can be placed include microcars, subcompact cars, compact cars, mid size cars, full size cars, entry level luxury cars, mid size luxury cars, full size luxury cars, sport coupes, convertibles, station wagons, compact minivans, minivans, vans, mini sport utility vehicles (SUVs), compact SUVs, mid size SUVs, full size SUVs, mini pickup trucks, mid size pickup trucks, full size pickup trucks, heavy duty full sized pickup trucks, small trucks, medium trucks, and heavy trucks. Although the receptacle is shown in FIG. 1 as having a substantially rectangular shape, the receptacle can have other suitable shapes such as a circular cross-sectional shape.

Referring to FIGS. 1 and 4, kit 10 further includes a floor mat 26 having a top side 23 comprising a coupler 28 releasably attachable to coupler 24 of bottom side 22 of collapsible receptacle 11. Because the floor mat and receptacle can be coupled together, the floor mat stabilizes the receptacle during use. However, because the floor mat and receptacle are releasably coupled together, the receptacle can be removed from the floor mat and the contents of the receptacle can be discarded. As with the receptacle, the floor mat can include any corresponding number of couplers so long as the receptacle can be securely attached to the floor mat. The couplers of the receptacle and the floor mat can be any suitable complimentary fasteners, such as, for example, hook and loop fasteners, buttons, snap fasteners, buckles, or other types of male/female fasteners. The bottom side of the floor mat can also include knobs or spikes to grip the vehicle floor or otherwise stabilize the floor mat to the vehicle floor.

Referring to FIGS. 5 and 6, a kit further includes a driver side fastener 30 sized and configured to attach to the back of a driver side car seat 31. The kit also includes a front passenger side fastener 32 sized and configured to attach to the back of a front passenger side car seat 33. Although FIGS. 5 and 6 illustrate receiving parts of a buckle type fastener, the kit can include other types of fasteners such as, for example, a hook, loop, button, snap fastener, a hook and loop fastener, an adhesive or other types of male/female fasteners.

Figure 10:
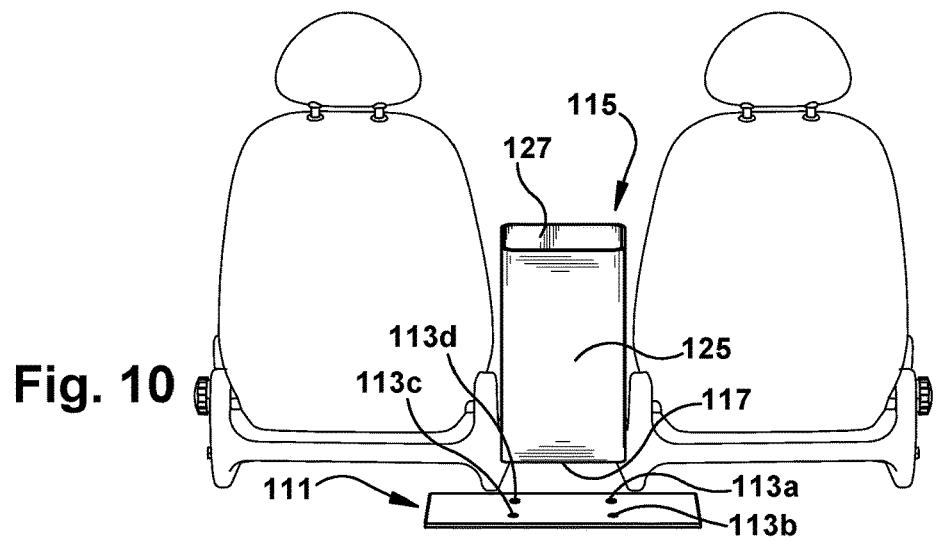
FIG. 10 is a schematic illustration of collapsible receptacle in a non-collapsed position in relation to a floor mat and a driver side car seat and a front passenger side car seat according to an embodiment of the present disclosure.

Referring to FIG. 7, a kit further includes an adjustable strap 34 comprising a left fastener 36 connectable to the driver side fastener 30 and a right fastener 38 connectable to the front passenger side fastener 32. Although FIG. 7 illustrates insertion parts of a buckle type fastener, the strap can have other types of fasteners that are complimentary to the drive side and front passenger side fasteners. In certain embodiments, the fastener attached to the back of the driver side car seat and the back of the front passenger side car seat is a loop through which an adjustable strap passes. Such a strap can have one or more fasteners (such as VELCRO) that attaches to another portion of the strap to secure the strap in place. Strap 34 has a portion 40 between the left and right fastener that is configured to support the back side of the collapsible receptacle when the receptacle is in an upright, non-collapsed position as illustrated in FIG. 10. The strap is adjustable to accommodate different distances between the driver side car seat and the front passenger side car seat. The strap can be adjusted, for example, from a minimum length of about 20 inches to a maximum length of about 60 inches. As illustrated in FIG. 7, strap 34 can include a slider 42 or position adjuster to facilitate adjustment of the length of the strap. The strap can be integral with the receptacle or separable from the receptacle.

As illustrated in FIG. 8, in certain embodiments, a back side 52 of a collapsible receptacle 50 can include grooves 54 configured for passage of a strap therethrough. Such grooves can secure the strap in place when the receptacle is in an upright non-collapsed position. Collapsible receptacle 50 can also include grooves 54 on the left, right and/or front sides of the receptacle.

Figure 11:
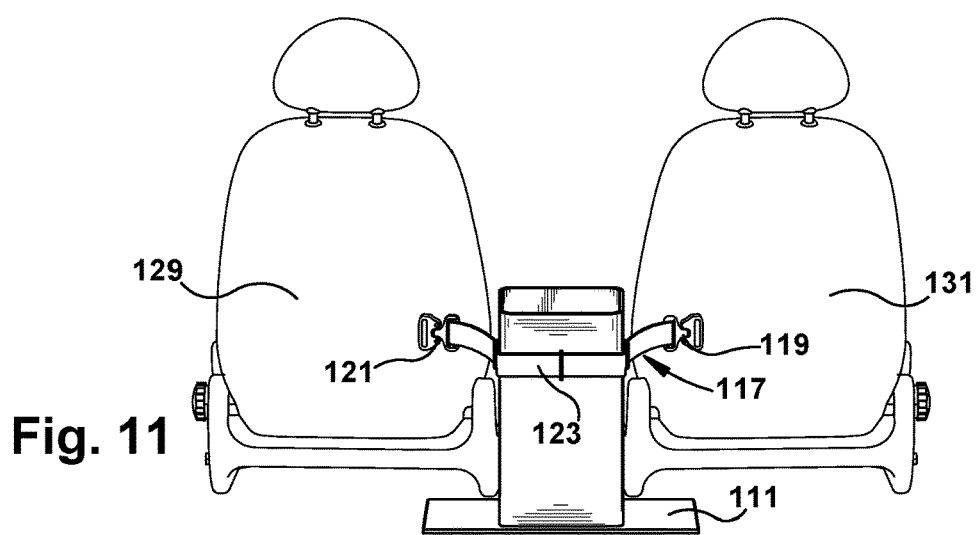
FIG. 11 is a schematic illustration of a strap positioned against the back side of a collapsible receptacle and coupled to the back of the driver side and front passenger side car seats.
Figure 12:
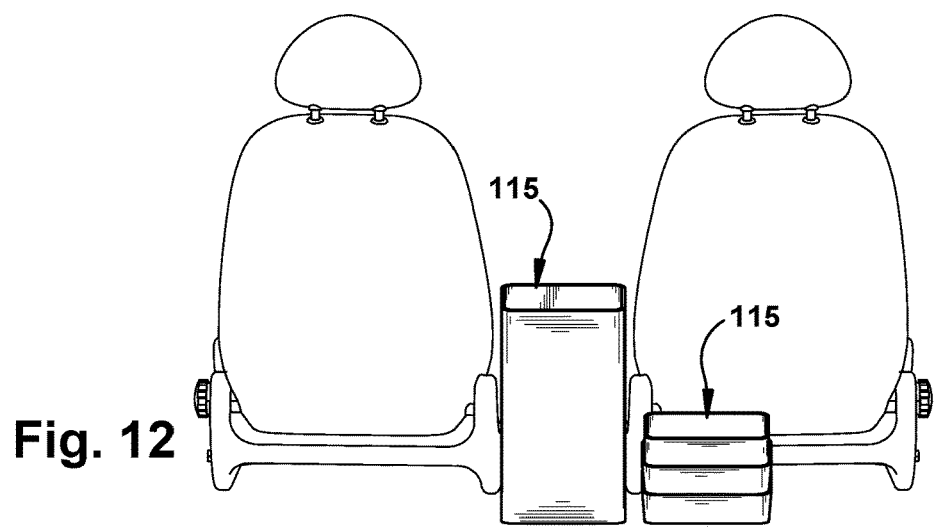
FIG. 12 is a schematic illustration of a collapsible receptacle in a stowed position in relation to a driver side car seat and a front passenger side car seat according to an embodiment of a kit the present disclosure.

The present disclosure also provides a method of collecting material from a car. Referring to the flow chart of FIG. 9 in conjunction with exemplary FIGS. 10-12, an embodiment of a method 100 comprises obtaining (110) a collapsible receptacle 115 having a back side 125, an open top side 127, and a bottom side 117 having a coupler attached thereto. The collapsible receptacle 115 is fabricated from a hard material. The method further includes obtaining (112) a strap 117 comprising a left fastener 121 and a right fastener 119 and having a support portion 123 therebetween that is configured to support the back side 125 of the collapsible receptacle 115. The method also includes obtaining (114) a floor mat 111 having a coupler 113 that is releasably attachable to a coupler of the bottom side 117 of the collapsible receptacle 115 as illustrated in FIG. 10. The method further includes attaching (116) the coupler of the collapsible receptacle 115 to the coupler 113 of the floor mat 111. The method additionally includes placing (118) the attached collapsible receptacle and floor mat between or behind a driver side car seat and a front passenger side car seat. As illustrated FIG. 11, the method further includes positioning (120) the support portion 123 of the strap 117 against the back side 125 of the collapsible receptacle 115. The method also includes attaching (122) the left fastener 121 of the strap 117 to the back 129 of the driver side car seat and attaching the right fastener 119 of the strap 117 to the back 131 of the front passenger side car seat. The order in which these steps are performed can vary so long as the collapsible receptacle is securely positioned inside the car after assembly. The method then includes collecting material placed in the collapsible receptacle (124), detaching the collapsible receptacle from the floor mat (126), and removing the material from the collapsible receptacle (128). As illustrated in FIG. 12, the collapsible receptacle 115 can be collapsed after the material has been removed and the receptacle is no longer in use (floor mat is not shown for purposes of clarity).

Each of the disclosed aspects and embodiments of the present disclosure may be considered individually or in combination with other aspects, embodiments, and variations of the disclosure. Further, while certain features of embodiments of the present disclosure may be shown in only certain figures, such features can be incorporated into other embodiments shown in other figures. Additionally, when describing a range, all points within that range are included in this disclosure. In addition, unless otherwise specified, none of the steps of the methods of the present disclosure are confined to any particular order of performance. Furthermore, all references cited herein are incorporated by reference in their entirety.

What is claimed is:
1. A kit for collecting material in a vehicle comprising:
a collapsible receptacle having a front side, a back side, a left side, a right side, an open top side, and a bottom side having a coupler attached thereto, the receptacle fabricated from a hard material;
a driver side fastener sized and configured to attach to the back of a driver side car seat;
a front passenger side fastener sized and configured to attach to the back of a front passenger side car seat;
an adjustable strap comprising at least one fastener, the strap having a portion that is sized and configured to support the back side of the collapsible receptacle; and a floor mat having a top side comprising a coupler releasably attachable to the coupler of the bottom side of the collapsible receptacle.

2. The kit of claim 1, wherein the at least one fastener is a hook and loop fastener.

3. The kit of claim 1, wherein the at least one fastener of the adjustable strap is a left fastener and a right fastener, the left fastener connectable to the driver side fastener, the right fastener connectable to the front passenger side fastener.

4. The kit of claim 3, wherein the portion of the adjustable strap that is sized and configured to support the back side of the collapsible receptacle is between the left and right fasteners.

5. The kit of claim 1, wherein the back side of the collapsible receptacle comprises grooves configured for passage of the adjustable strap therethrough.

6. The kit of claim 1, further comprising a lid sized and configured to cover the open top side of the collapsible receptacle.

7. A method of collecting and removing material from a car comprising:
   obtaining a collapsible receptacle having a front side, a back side, a left side, a right side, an open top side, and a bottom side having a coupler attached thereto, the collapsible receptacle fabricated from a hard material;
   obtaining an adjustable strap comprising at least one fastener and having a support portion that is sized and configured to support the back side of the collapsible receptacle;
   obtaining a floor mat having a coupler that is releasably attachable to the coupler of the bottom side of the collapsible receptacle;
   placing the floor mat between or behind a driver side car seat and a front passenger side car seat;
   attaching the coupler of the collapsible receptacle to the coupler of the floor mat;
   positioning the support portion of the adjustable strap against the back side of the collapsible receptacle;
   securing the adjustable strap to the back of the driver side car seat and the back of the front passenger side car seat;
   collecting material placed in the collapsible receptacle;
   detaching the collapsible receptacle from the floor mat; and
   removing the material from the collapsible receptacle.

8. The method of claim 7, wherein the at least one fastener of the adjustable strap is a left fastener and a right fastener.

9. The method of claim 3, wherein the portion of the adjustable strap that is sized and configured to support the back side of the collapsible receptacle is between the left and right fasteners.

10. The method of claim 8, wherein securing the adjustable strap to the back of the driver side car seat and the back of the front passenger side car seat comprises attaching the left fastener of the adjustable strap to the back of the driver side car seat and attaching the right fastener of the adjustable strap to the back of the front passenger side car seat.

11. A vehicle comprising:
    a collapsible receptacle having a front side, a back side, a left side, a right side, an open top side, and a bottom side having a coupler attached thereto, the receptacle fabricated from a hard material;
    a driver side car seat comprising a driver side fastener attached to the back of the driver side car seat;
    a front passenger side car seat comprising a front passenger side fastener attached to the back of the front passenger side car seat; and
    an adjustable strap comprising at least one fastener, the strap having a portion that is sized and configured to support the back side of the collapsible receptacle.

12. The vehicle of claim 11, further comprising a floor mat having a top side comprising a coupler releasably attachable to the coupler of the bottom side of the collapsible receptacle.

13. The vehicle of claim 11, wherein the driver side fastener and the front passenger side fastener is a hook and loop fastener.

14. The vehicle of claim 11, wherein the driver side fastener and the front passenger side fastener is a hook.

\* \* \* \* \*